US011251874B1

(12) United States Patent
Parker

(10) Patent No.: US 11,251,874 B1
(45) Date of Patent: Feb. 15, 2022

(54) OPTICAL REDISTRIBUTION LAYERS FOR HIGH-CHANNEL-COUNT PHOTONICS

(71) Applicant: Juniper Networks, Inc., Sunnyvale, CA (US)

(72) Inventor: John Parker, Goleta, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/008,516

(22) Filed: Aug. 31, 2020

(51) Int. Cl.
| | |
|---|---|
| *H04B 10/50* | (2013.01) |
| *H04B 10/40* | (2013.01) |
| *H04B 10/66* | (2013.01) |
| *G02B 6/12* | (2006.01) |
| *G02B 6/13* | (2006.01) |

(52) U.S. Cl.
CPC ....... *H04B 10/505* (2013.01); *G02B 6/12004* (2013.01); *G02B 6/12007* (2013.01); *G02B 6/13* (2013.01); *H04B 10/40* (2013.01); *H04B 10/66* (2013.01); *G02B 2006/12061* (2013.01); *G02B 2006/12142* (2013.01); *G02B 2006/12164* (2013.01)

(58) Field of Classification Search
CPC ...... H04B 10/505; H04B 10/66; H04B 10/40; G02B 6/12004; G02B 6/12007; G02B 6/13; G02B 2006/12061; G02B 2006/12142; G02B 2006/12164; H04L 310/505
USPC .................................................... 398/43–48
See application file for complete search history.

(56) References Cited

U.S. PATENT DOCUMENTS

| | | | | |
|---|---|---|---|---|
| 6,134,033 A | * | 10/2000 | Bergano | H04B 10/2507 |
| | | | | 398/1 |
| 7,079,715 B2 | * | 7/2006 | Kish, Jr | G02B 6/12019 |
| | | | | 385/14 |
| 8,644,714 B2 | | 2/2014 | Kwon et al. | |
| 9,485,026 B2 | * | 11/2016 | Park | H04B 10/40 |
| 9,620,489 B2 | | 4/2017 | Lipson et al. | |
| 10,527,796 B2 | * | 1/2020 | Spannagel | G02B 6/42 |
| 10,637,584 B1 | * | 4/2020 | Palmer | H04Q 11/0005 |
| 10,686,526 B2 | | 6/2020 | Mekis et al. | |
| 11,057,114 B2 | * | 7/2021 | Chen | H04B 10/075 |
| 2003/0133641 A1 | * | 7/2003 | Yoo | B82Y 20/00 |
| | | | | 385/14 |

(Continued)

FOREIGN PATENT DOCUMENTS

| | | |
|---|---|---|
| JP | 2012502315 | 1/2012 |
| JP | 2017059933 | 3/2017 |

(Continued)

OTHER PUBLICATIONS

Roberto et al; A new manufacturing approach to optical transceivers; Mar. 2019; Juniper Networks; pp. 1-4. (Year: 2019).*

(Continued)

*Primary Examiner* — Amritbir K Sandhu
(74) *Attorney, Agent, or Firm* — Schwegman Lundberg & Woessner, P.A.

(57) ABSTRACT

High-channel-count optical transceivers can be implemented in photonic integrated circuits (PICs) with shared lasers, splitting the light of each laser between multiple lanes prior to modulation. To reduce waveguide crossings in such PICs, transmitter and self-test functionality may be distributed between separate device layers. Various beneficial transmitter circuitry layouts are disclosed.

20 Claims, 7 Drawing Sheets

(56) References Cited

U.S. PATENT DOCUMENTS

| | | | |
|---|---|---|---|
| 2011/0101438 A1* | 5/2011 | Yoo | H01L 29/40114 257/316 |
| 2011/0163394 A1* | 7/2011 | Park | H01L 27/10888 257/413 |
| 2012/0141130 A1* | 6/2012 | Nakashima | H04B 10/505 398/82 |
| 2015/0222968 A1* | 8/2015 | Garcia | H04B 10/40 398/48 |
| 2015/0381273 A1* | 12/2015 | Gloeckner | H04L 1/243 398/16 |
| 2018/0262268 A1 | 9/2018 | Nagarajan | |
| 2020/0105956 A1* | 4/2020 | Smith | H01L 31/0747 |
| 2020/0379180 A1* | 12/2020 | Yamauchi | G02B 6/2938 |

FOREIGN PATENT DOCUMENTS

| | | | |
|---|---|---|---|
| WO | 2008046340 | 4/2008 | |
| WO | WO-2013185218 A1 * | 12/2013 | H04B 10/506 |

OTHER PUBLICATIONS

Marcoccia et al; A New Manufacturing Approach to Optical Transceivers; Official Juniper Network blogs; Mar. 2019; pp. 1-9. (Year: 2019).*

Biberman, Aleksandr, "Photonic Network on Chip Architectures using Multilayer deposited Silicon Materials for High Performance Chip Multiprocessors", ACM Journal on Emerging Technologies in Computing Systems Article No. 7, (Jun. 2011), 25 pgs.

Bogaerts, Wim, "Design Challenges in Silicon Photonics", IEEE Journal of Selected Topics in Quantum Electronics vol. 20, Issue: 4, (2014), 8 pgs.

Han, Sangyoon, "Highly Scalable Silicon Photonic Switches Based on Waveguide Crossbar with Movable Waveguide Couplers", UC Berkeley Electronic Theses and Dissertations, (2016), 89 pgs.

Sacher, Wesley D, "Monolithically Integrated Multilayer Silicon Nitride on Silicon Waveguide Platforms for 3-D Photonic Circuits and Devices", Proceedings of the IEEE vol. 106, Issue: 12, (Dec. 2018), 14 pgs.

Yiwen, Yiwen, "Silicon Photonics for Extreme Scale Systems", Journal of Lightwave Technology vol. 37, Issue: 2, (Jan. 15, 2019), pp. 245-259.

Zhang, Yang, "Multi-layer Silicon photonic Devices for On-chip interconnects", Dissertation The University of Texas at Austin, (Dec. 2013), 119 pgs.

"European Application Serial No. 20209053.6, Extended European Search Report dated Jun. 1, 2021", 5 pgs.

* cited by examiner

US 11,251,874 B1

OPTICAL REDISTRIBUTION LAYERS FOR HIGH-CHANNEL-COUNT PHOTONICS

TECHNICAL FIELD

This disclosure relates generally to high-channel-count photonic integrated circuits (PICs), and in particular to optical transceiver circuits.

BACKGROUND

Optical communication networks use optical transmitters, e.g., including lasers and optical modulators, to encode data onto optical signals on one end of a communication link, and optical receivers, e.g., implemented with photodiodes, to reproduce the data from the optical signals at the other end. Transmitters and receivers are often integrated in the same photonic circuit to form an optical transceiver that can both send and receive optical signals to serve as a node in the communication network. To facilitate transporting multiple optical signals, corresponding to multiple communication channels, via the same optical fiber, transceiver circuits may generate optical signals at multiple wavelengths and multiplex them into multi-channel output signals. Further, at each wavelength, multiple optical signals may be generated for transmission at different transmitter output ports via different optical fibers to different destinations. For example, a transceiver may be configured to support sixteen communication channels, four each at four different wavelengths, for four multiplexed, multi-channel optical output signals. In addition, for purposes of testing transmitter and receiver functionality without the need for external light sources and photodetectors, transceiver circuits may include loopback paths that, when the transceiver is switched from its normal operational mode (or "mission mode") to test mode, route the optical signals from the transceiver circuit to the photodiodes. As channel counts increase to meet the capacity needs for growing amounts of data, the transceiver circuits becomes increasingly complex and costly, especially in transceivers with self-test functionality.

BRIEF DESCRIPTION OF THE DRAWINGS

Various embodiments addressing the challenges associated with high-channel-count optical transceivers are described herein with reference to the accompanying drawings.

DESCRIPTION

Figure 1A:
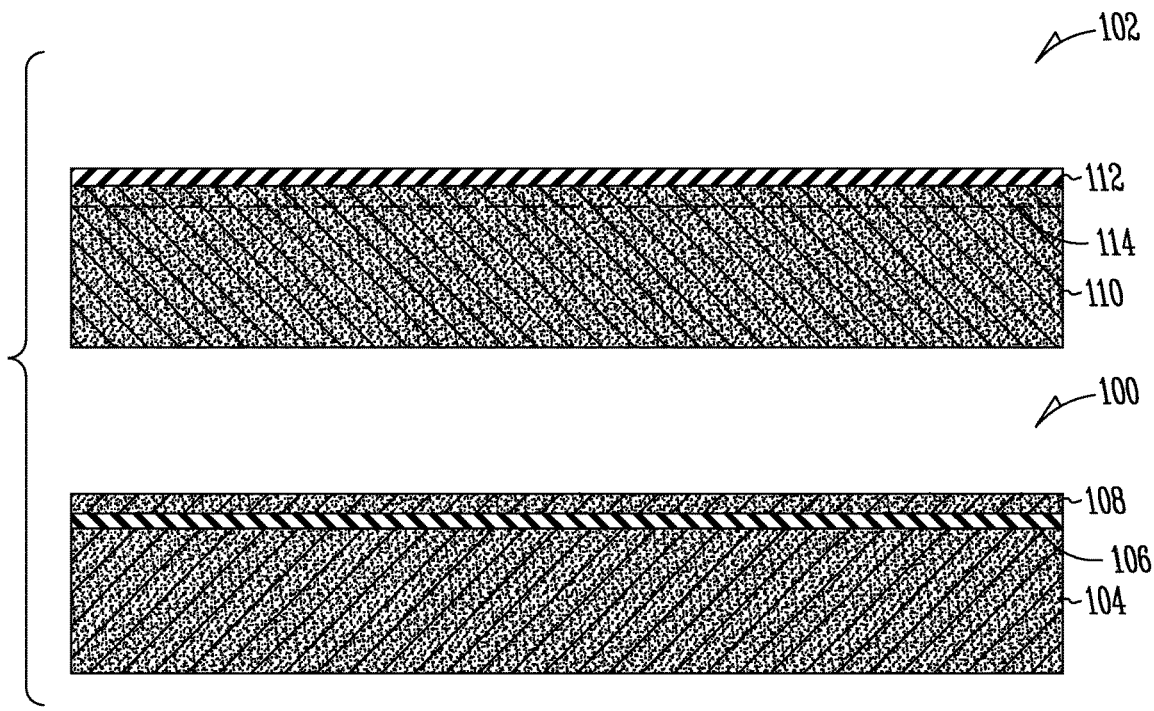
FIGS. 1A-1E illustrate, with a sequence of schematic cross-sectional side views of multi-layer substrates, an example fabrication process for a PIC including multiple device layers, in accordance with various embodiments.

Described herein are optical transceiver PICs with shared laser sources, meaning that the light output by each individual laser is split between multiple lanes before data is imparted by modulation to create optical signals at the laser wavelength for different communication channels associated with the multiple lanes. Shared laser sources are beneficial for high-channel-count PICs in that they significantly reduce the number of lasers and the footprint, power consumption, and cost associated with them. For example, a four-wavelength, sixteen-channel transceiver may be implemented with four lasers whose outputs are each split between four lanes, rather than with sixteen lasers as would be used in many conventional transceiver circuits. To achieve sufficient optical intensities of the split laser light, the light may be amplified, prior to modulation, by semiconductor optical amplifiers (SOAs), which are generally cheaper than lasers.

The use of shared laser sources generally comes at the cost of more complex waveguide configurations to route light between optical devices from the lasers to the output ports or, in self-test mode, to the photodiodes, with multiple waveguide crossings that cause substantial optical losses. Circuit architectures and waveguide layouts that minimize the number of waveguide crossings are desirable. In accordance with various embodiments, the number of waveguide crossings in optical transceivers with shared lasers is reduced by distributing the transmitter and self-test functionality between two (or more) device layers. More specifically, in some embodiments, a transceiver PIC is formed on a silicon-on-insulator (SOI) substrate that includes two silicon waveguide layers, separated by an oxide or other dielectric layer. The top silicon waveguide layer, along with a layer of compound semiconductor (e.g., III-V) structures bonded thereto, forms the first, hybrid device layer, which implements the transmitter circuitry, including lasers, SOAs, optical modulators, multiplexers, and output couplers, as well as the photodiodes of the receivers. The bottom silicon waveguide layer serves as the second device layer, in which the loopback paths to the receiver photodiodes are implemented, with grating couplers underneath the photodiodes directing light out-of-plane into the photodiodes, which may be formed in the compound semiconductor layer.

FIGS. 1A-1E illustrate, with a sequence of cross-sectional side views of multi-layer substrates, an example fabrication process for a PIC including multiple device layers, in accordance with various embodiments. A substrate with multiple silicon waveguide layers can be made from two silicon-based substrates 100, 102, shown in FIG. 1A. One substrate 100 is an ordinary SOI substrate including a thick silicon handle 104, a buried oxide or other dielectric layer 106 (e.g., of silicon dioxide) on top of the handle 104, and a thin silicon device layer 108 on top of the dielectric layer 106. The other substrate 102 includes a thick silicon layer 110 coated by an oxide (e.g., silicon dioxide) or other dielectric layer 112, with a layer of implanted defects 114 (e.g., including hydrogen) in the silicon layer 110 near the dielectric layer 112.

Figure 1B:
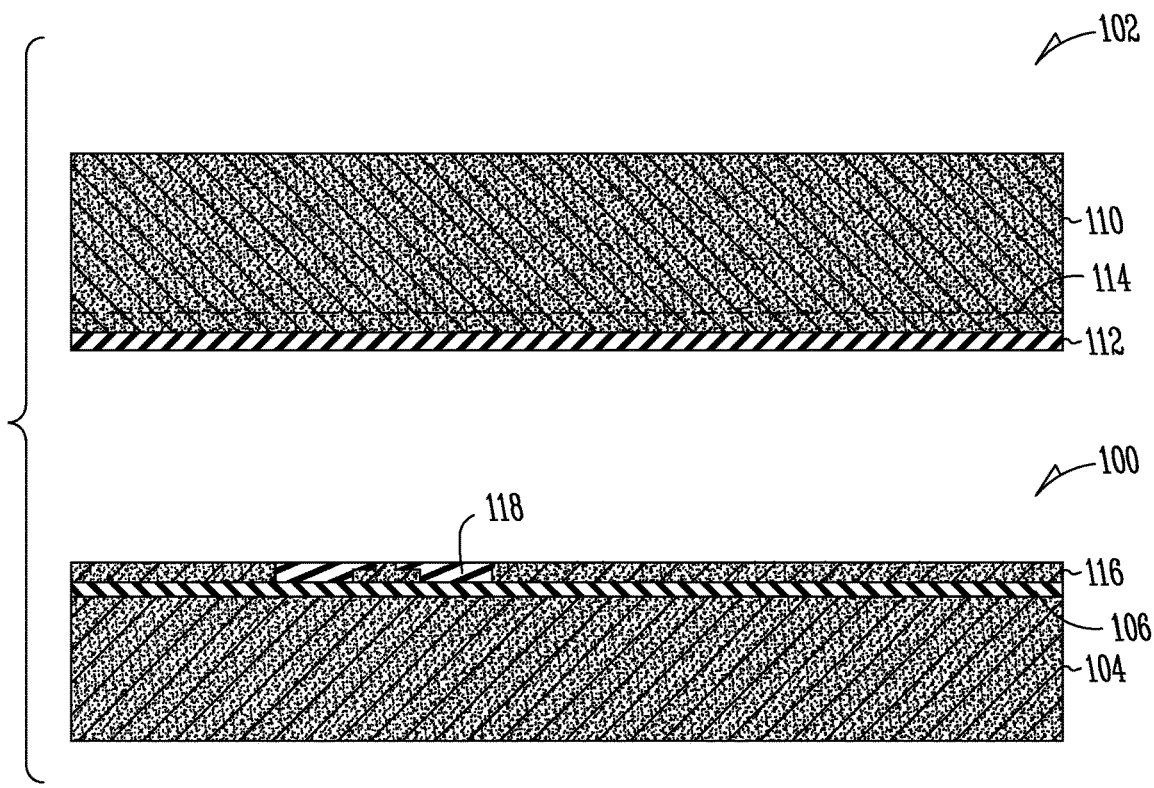
Figure 1C:
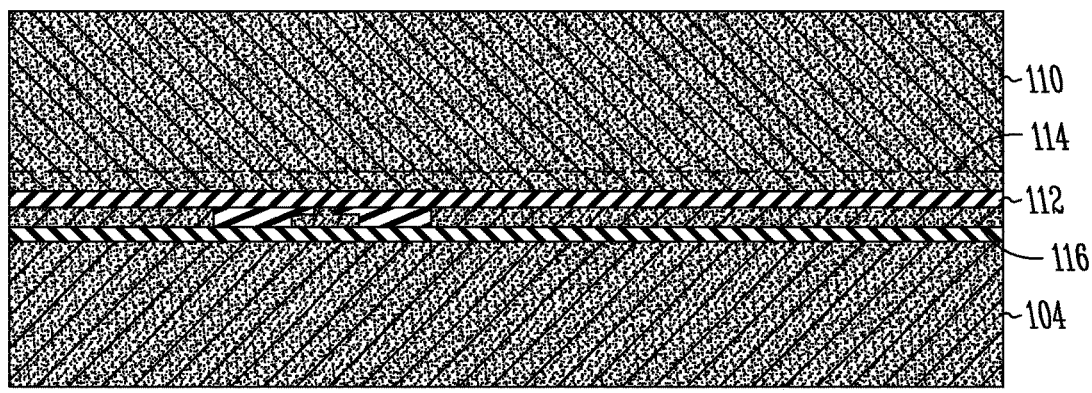

As shown in FIG. 1B, the silicon device layer 108 of the SOI substrate 100, which will serve as the bottom silicon waveguide layer 116 of the multi-layer PIC, is patterned to form the optical loopback circuitry, which includes loopback paths for all of the channels, as well as optical couplers to couple light from the optical transmitter circuitry into the loopback circuitry and from the loopback circuitry up to the receivers. The patterning may be performed, e.g., using photolithographic patterning and etching processes known to those of ordinary skill in the art, followed by applying an oxide (e.g., silicon dioxide) or other dielectric fill 118 to form a device layer of uniform thickness. The substrate 102 with implanted defects 114 may be flipped over, as shown in FIG. 1B, and bonded, dielectric layer 112 down, to the patterned silicon device layer 108 of the SOI substrate 102, as shown in FIG. 1C. The thick silicon layer 110 can then be broken along the layer of implanted defects 114, e.g., using the well-known smart cut process, leaving in place a thin silicon layer that will serve as the top silicon waveguide layer 120. Another option for transferring a thin layer of silicon onto a support, e.g., in this case, the SOI substrate 100, is bond and etch back SOI (BESOI), wherein the ion-implant-assisted break is not used, but, instead, the transferred silicon substrate is etched back until the desired thickness is reached.

Figure 1D:
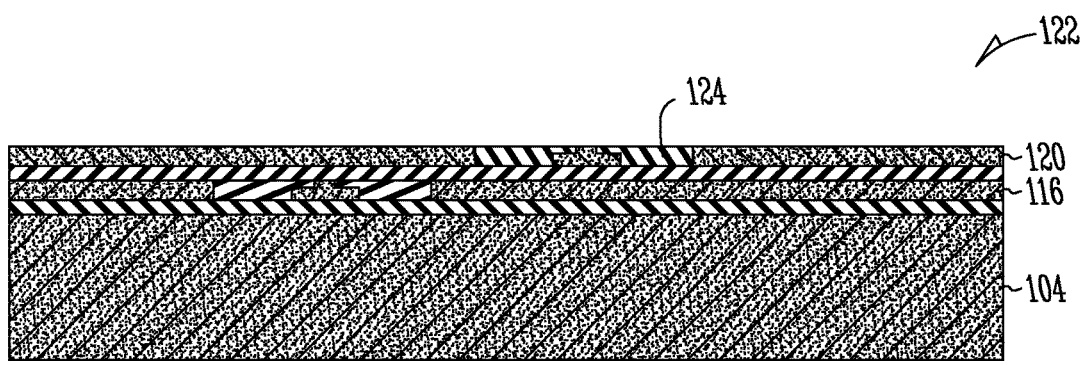
Figure 1E:
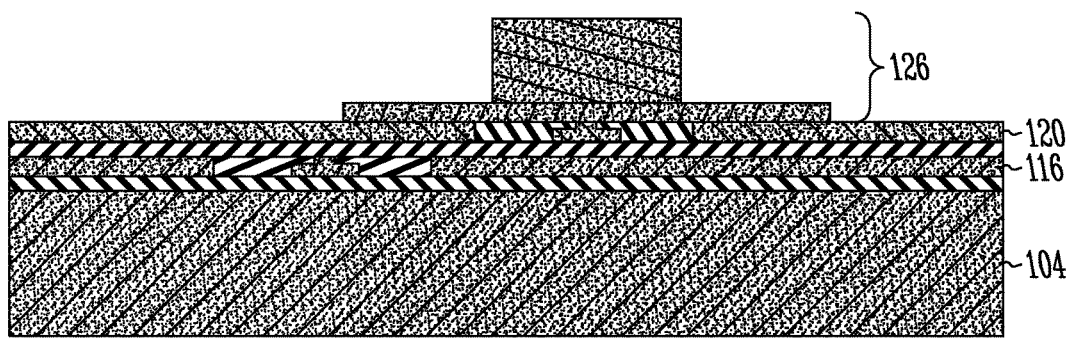

FIG. 1D shows the resulting multi-layer structure 122 including top and bottom silicon waveguide layers 120, 116. Like the bottom silicon waveguide layer 116, the top silicon waveguide layer 120 may be patterned by conventional photolithographic patterning and etching processes, e.g., to form passive device structures (such as waveguides), and planarized with an oxide or other dielectric fill 124. Once the top silicon waveguide layer 120 has thus been patterned, die of III-V material (such as, e.g., indium phosphide (InP), indium arsenide (InAs), gallium arsenide (GaAs), gallium nitride (GaN), or indium antimonide (InSb)) or some other semiconductor compound material, often including multiple sub-layers that differ in the precise material composition, may be bonded to the top silicon waveguide layer 120 (directly or via a thin bonding layer in between), and patterned by photolithographic patterning and etching to form a layer 126 of active device structures (e.g., for the lasers, modulators, photodiodes, etc.), illustrated in FIG. 1E. Further fabrication steps include the deposition and patterning of metal layers, in some cases alternatingly with dielectric layers, to create device metallization and metal traces, vias, and bonding pads for connecting various optically active device structures (such as diode structures as used in lasers, amplifiers, electro-absorption modulators (EAMs), and photodiodes), heaters, or other electrically controlled devices to electrical terminals. Collectively, the patterned top silicon waveguide and compound semiconductor layers 120, 126, along with the electrical connections of the optical devices, implement the optical transmitter circuitry.

Various embodiments provide beneficial architectures of the transceiver circuit, designed for a low number of waveguide crossings, in particular, in the transmitter circuitry implemented in the top silicon waveguide layer 120. Minimizing waveguide crossings in the loopback circuitry is generally less important, as the loopback circuitry is not used during mission mode, and, having no coupling losses out of and into the PIC, no external channel losses or dispersion, and no external reflections that can create multipath interference, starts off with much better performance, rendering it more tolerant to added losses.

FIGS. 2-5 illustrate various layouts of the transmitter circuitry of a multi-wavelength transceiver with shared lasers. Specifically, in the depicted examples, the transceiver includes four lasers emitting light at four respective wavelengths $\lambda_0$, $\lambda_1$, $\lambda_2$, and $\lambda_3$, and the light from each of the four lasers is split between four lanes, for a total of sixteen lanes. The general design principles discussed below, as well as the resulting numbers of waveguide crossings per lane for each design, are, however, generalizable to higher numbers of lasers ($N_\lambda$) and to higher or smaller numbers of lanes (M lanes in total, m lanes per wavelength, m≥2, M=m·$N_\lambda$), and it will be readily apparent to those of ordinary skill in the art how to extend the illustrated layouts to accommodate different numbers of lasers and/or lanes per wavelength.

In the transmitter circuitry layouts of FIGS. 2-5, multiplexing across the four wavelengths is achieved in two stages. At the first stage, 2×1 multiplexers each combine light across two wavelengths of one of two pairs of wavelengths, e.g., $\lambda_0$ and $\lambda_1$ or $\lambda_2$ and $\lambda_3$. At the second stage, additional 2×1 multiplexers each combine two of the partially multiplexed optical signals output by the first stage to generate optical transmitter output signals including all four wavelengths. In accordance with various embodiments, optical output couplers that transmit the output signals double as the multiplexers of the second stage. It is, of course, also possible to, alternatively, use a dedicated multiplexer preceding each output coupler. To accommodate higher numbers of wavelengths, additional multiplexer stages may, in principle, be added. Alternatively, higher-order multiplexers may be used. For purposes of the generalized formulas for the number of waveguide crossings provided below, it is assumed that the multiplexers in the first stage are each configured to multiplex across $N_\lambda/2$ wavelengths. For example, for a transceiver using eight wavelengths, the first multiplexing stage may consist of 4×1 multiplexers that each combine light across either $\lambda_0$-$\lambda_3$ or $\lambda_4$-$\lambda_7$.

FIGS. 2-5 provide layouts for a four-wavelength, sixteen-lane transceiver, which differ in the arrangement of their first-stage multiplexers, with implications for the waveguide crossings of their incoming and outgoing waveguides.

Figure 2:
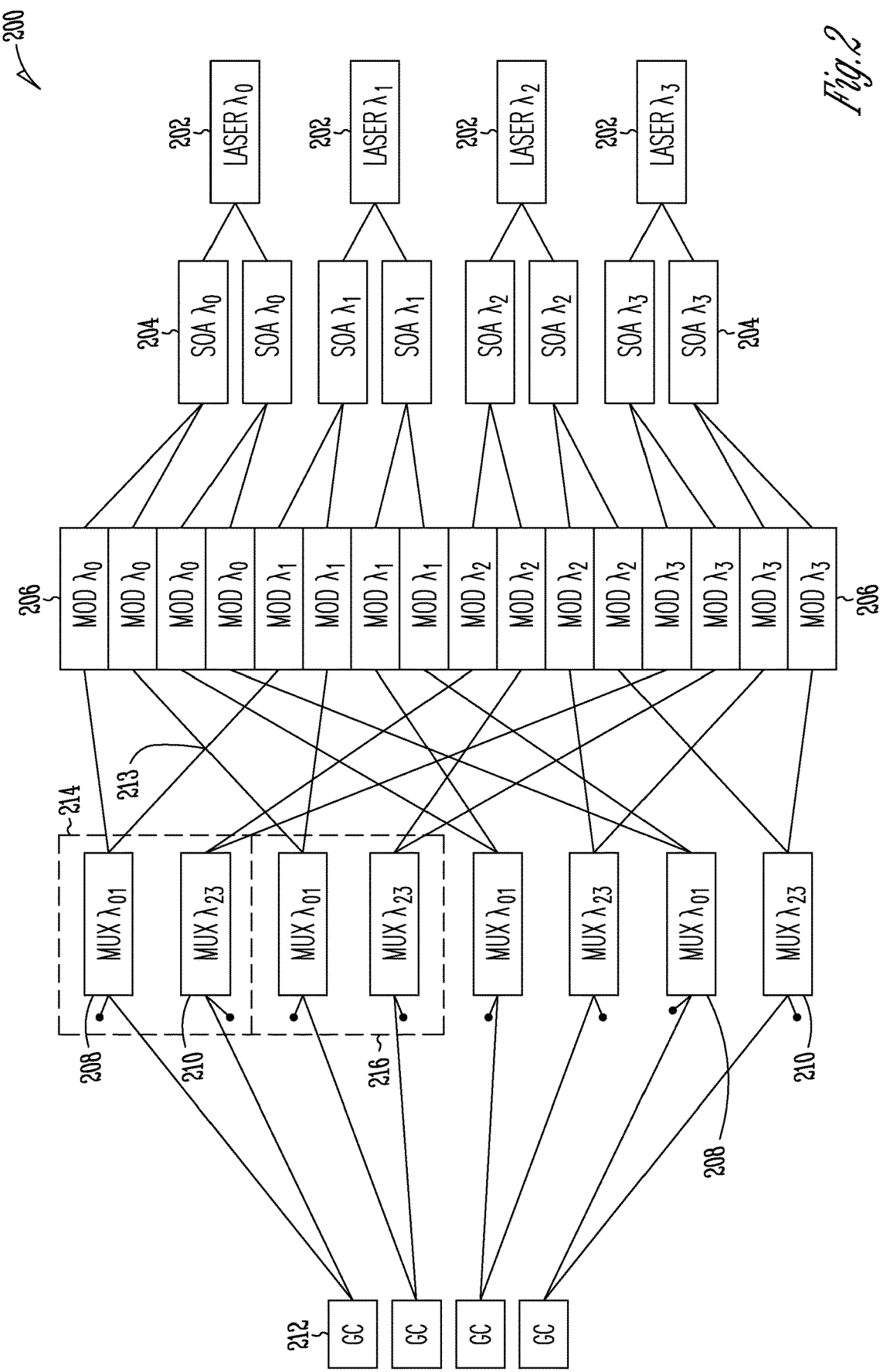
FIG. 2 is a schematic example transmitter circuitry layout in which multiplexers for different pairs of wavelengths are arranged along a column, alternating by wavelength, in accordance with one embodiment.

FIG. 2 is a schematic transmitter circuitry layout 200 in which multiplexers for different pairs of wavelengths are arranged along a column, alternating by wavelength, in accordance with one embodiment. The transmitter circuitry includes four lasers 202 that emit light at four different wavelengths $\lambda_0$, $\lambda_1$, $\lambda_2$, and $\lambda_3$. The lasers may be, for instance, distributed feedback (DFB) laser diodes or distributed Bragg reflector (DBR) lasers, and may be created in epitaxially grown III-V (e.g., GaAs or InP) die (herein also "epi die"). Typically, a separate bonded epi die is used for each laser wavelength. The optical output signals of the lasers 202 are each split, e.g., in a two-stage cascade of Y-junctions, multimode interferometers (MMI), or some other type of optical splitters, between four lanes. Eight SOAs 204 located between the two splitting stages amplify the light to achieve sufficient signal levels. An additional layer of SOAs may again amplify the light following the second splitting stage, preceding the optical modulators 206, but is often not needed in practice.

In hybrid silicon-compound semiconductor PICs, using a single shared laser for each wavelength can significantly reduce manufacturing cost, as one laser and two SOAs split to four lanes (three diodes total) can replace four lasers (four diodes total), as the epi required for an SOA is smaller than that for a laser, and the total number of diodes required is fewer. In addition, using fewer lasers reduces power consumption, e.g., due to simplified and lower-power electronic control circuitry for tunable lasers, e.g., as heater-based wavelength control of the laser's filters is required for only a single laser rather than four independent lasers. The added cost of the SOAs 204, which are significantly cheaper than the lasers 202, usually does not consume the cost savings attained by sharing lasers. In some embodiments, the laser 202 and associated (two) SOAs 204 for each wavelength are formed in the same epi die, potentially providing further cost savings. In other embodiments, separate epi die are used for the lasers 202 and the SOAs 204 to facilitate different sub-layer structures fine-tuned for the respective device function. The grouping of the same wavelength lanes after the SOAs 204 allows a single modulator epi die to be used for each wavelength group (e.g., implementing lanes for all four $\lambda_0$ lanes with a single epi die), which also greatly reduces epi cost.

The transmitter circuitry includes an optical modulator 206 for each of the sixteen lanes, that is, four optical modulators 206 to generate modulated optical signals at wavelength $\lambda_0$, four modulators 206 for $\lambda_1$, four modulators for $\lambda_2$, and four modulators for $\lambda_3$. The optical modulators 206 may be implemented, e.g., by EAMs, or by Mach-Zehnder interferometers (MZIs) including phase shifters in one or both interferometer arms. Phase shifters, in turn, may be implemented, e.g., by p-n or p-i-n junctions in the silicon waveguides or in bonded III-V waveguides forming the interferometer arms.

The modulated optical signals output by the modulators 206 are multiplexed, as noted above, in two stages, into optical transmitter output signals each including four channels corresponding to the four wavelengths. In the first stage, eight 2×1 multiplexers 208, 210 partially combine the sixteen modulated optical signals into eight partially multiplexed signals. The multiplexers 208, 210 may be thought of as pairs of multiplexers each including one multiplexer 208 that combines the modulated signals in two lanes associated with wavelengths $\lambda_0$ and $\lambda_1$ and one multiplexer 210 that combines signals in two lanes associated with wavelengths $\lambda_2$ and $\lambda_3$. The partially multiplexed signals output by each pair of multiplexers 208, 210 are then combined, in the second stage, by an associated output coupler 212 that possesses inherent multiplexing functionality, as shown, or by an associated second-stage multiplexer preceding the output coupler, alternatively. For example, numbering the lanes and associated modulators 206 in each set of lanes and modulators 206 associated with any given wavelength from one to four in their order of arrangement along the column, a first pair 214 of multiplexers 208, 210 and the associated first output coupler combine the modulated optical signals associated with the first lanes and first modulators of the four sets of lanes and modulators associated with the four wavelengths; a second pair 216 of multiplexers 208, 210 and the associated second output coupler combine the modulated optical signals associated with the second lanes and second modulators of the four sets of lanes and modulators, and so on. The multiplexers 208, 210 may be implemented, e.g., by MZIs. For transceivers with more than four wavelengths, where the multiplexers in the first stage each combine optical signals across more than two wavelengths, arrayed waveguide gratings (AWGs) may instead by used. The output couplers 212 may be, e.g., grating couplers, etch turning mirrors, or spot-size converters with etched silicon v-grooves for aligning single mode fiber.

As shown in FIG. 2 (and equally in FIGS. 3-5), the lasers 202 are all arranged along a single line, hereinafter arbitrarily referred to as a "column," for ease of reference. The associated SOAs 204 are arranged along a second column, that is, a second line generally parallel to the first. The optical modulators 206 associated with the sixteen lanes are arranged along a third column (generally parallel to the columns of lasers 202 and SOAs 204), spatially grouped by wavelength such that they can be positioned close to the lasers 202 and SOAs 204 whose output signals they modulate. As a result, as can be seen, the waveguides coupling the laser outputs to the SOA inputs and the SOA outputs to the modulator inputs can be arranged without any crossings. However, to multiplex the modulated optical signals across multiple wavelengths, some waveguide redistribution between the column of modulators 206 and the output couplers 212, which, as shown, may be arranged in a fourth column, is used, and waveguide crossings (e.g., crossing 213) become inevitable. The number and location of the waveguide crossings depend on the particular arrangement of the multiplexers 208, 210 of the first stage.

In the layout 200, multiplexers 208 combining wavelengths $\lambda_0$ and $\lambda_1$ and multiplexers 210 combining wavelengths $\lambda_2$ and $\lambda_3$ are arranged alternatingly along a single column, with the first through fourth pairs 214, 216, etc. of multiplexers 208, 210 associated with the first through fourth lanes, respectively, of the sets of lanes for the multiple wavelengths arranged in sequence. As a result of this configuration, the waveguide redistribution takes place entirely between the modulators 206 and the first multiplexer stage, and the outputs of the multiplexers 208, 210 can be connected to the output couplers 212 without further waveguide crossings. The configuration can be straightforwardly extended to a higher number of lanes per wavelength by adding an additional pair of multiplexers for each additional lane, and to a higher number of wavelengths by using higher-order multiplexers. With $N_\lambda \geq 4$ wavelengths and $m \geq 2$ lanes per wavelength, for a total of $M = m \cdot N_\lambda$ lanes, the maximum number $X_{max}$ of waveguide crossing for any lane with this design is:

$$X_{max} = M - \frac{M}{N_\lambda} - (N_\lambda - 1).$$

For $N_\lambda = 4$ and $M=16$, as shown in FIG. 2, this amounts to at most nine waveguide crossings associated with a given lane. (A waveguide crossing is deemed associated with a lane if it occurs anywhere along the optical path between the modulator 206 for the lane and the output coupler 212 receiving the modulated signal that is output by the modulator 206.)

Figure 3:
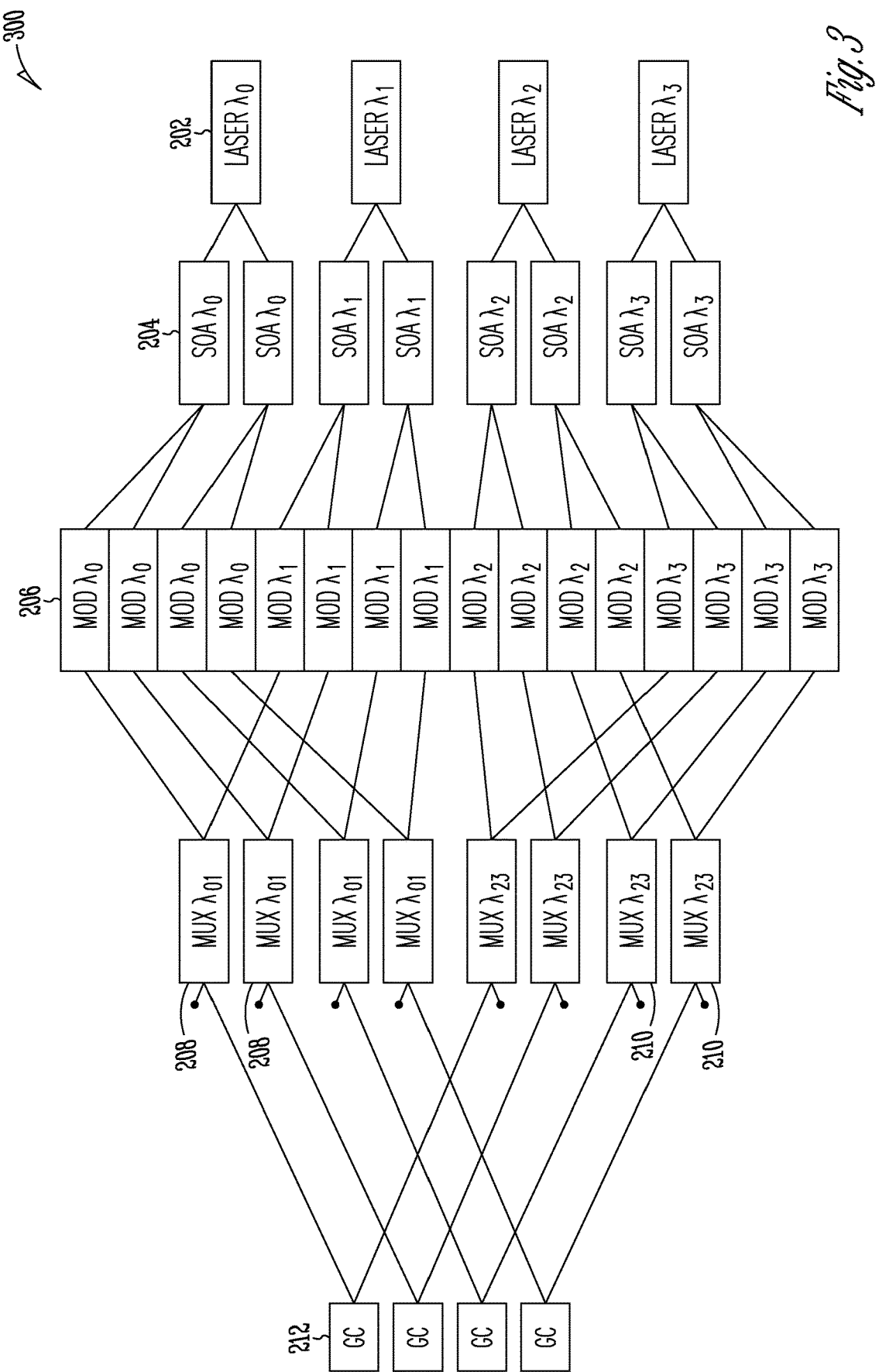
FIG. 3 is a schematic example transmitter circuitry layout in which multiplexers for different pairs of wavelengths are arranged along a column, spatially grouped by wavelength, in accordance with one embodiment.

FIG. 3 is a schematic transmitter circuitry layout 300 in which multiplexers for different pairs of wavelengths are arranged along a column, spatially grouped by wavelength, in accordance with one embodiment. The only difference between this layout 300 and the layout 200 of FIG. 2 is the ordering of the multiplexers 208, 210 within the column representing the first multiplexing stage, along with the resulting waveguide configuration. Here, the pairs 214, 216, etc. of multiplexers 208, 210 are split up. All multiplexers 208 combining wavelengths and $\lambda_1$ are grouped together in one half of the column, ordered in the same way as the lanes and modulators 206 with which they are associated. Similarly, all multiplexers 210 combining wavelengths $\lambda_2$ and $\lambda_3$ are grouped together in the other half of the column, likewise ordered in the same way as the lanes and modulators 206 with which the are associated. As can be seen, this layout results in waveguide redistribution and, accordingly, waveguide crossings, both before and after the first multiplexer stage. Beneficially, however, the maximum number of waveguide crossings for an individual lane is only:

$$X_{max} = 2\left(\frac{M}{N_\lambda} - 1\right),$$

which, for $N_\lambda=4$ and $M=16$, amounts to six.

Figure 4:
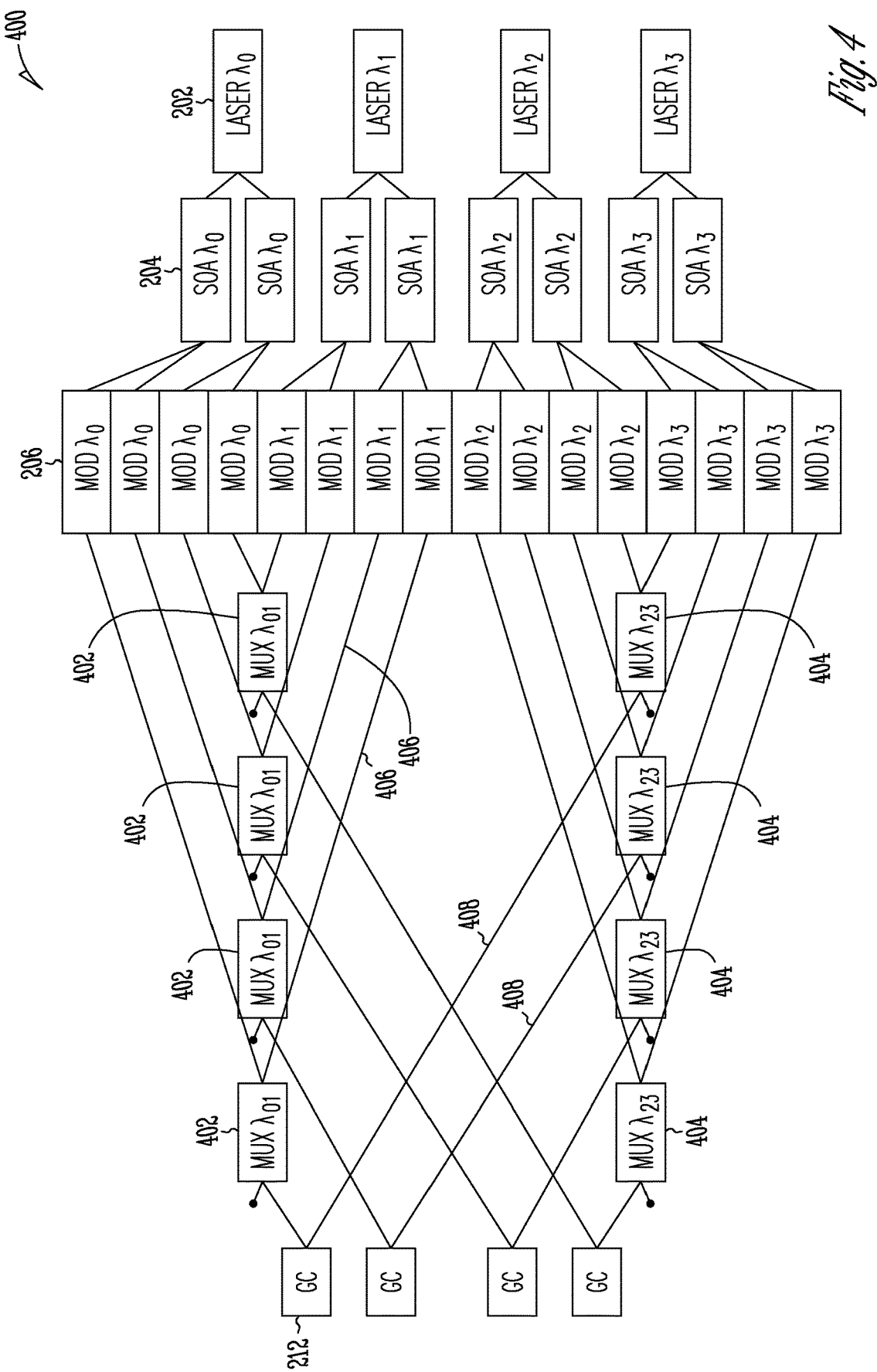
FIG. 4 is a schematic example transmitter circuitry layout in which multiplexers for different pairs of wavelengths are arranged in two respective rows, with symmetric waveguide distribution after the multiplexers, in accordance with one embodiment.

FIG. 4 is a schematic transmitter circuitry layout 400 in which multiplexers 402, 404 for different pairs of wavelengths are arranged in two respective rows, with symmetric waveguide distribution after the multiplexers 402, 404, in accordance with one embodiment. The multiplexers 402 that combine wavelengths $\lambda_0$ and $\lambda_1$ are grouped together in one row, and the multiplexers 404 that combine wavelengths $\lambda_2$ and $\lambda_3$ are grouped together in another row, e.g., as shown, substantially parallel to and horizontally aligned with the first row. The term "row" denotes that the alignment of the multiplexers 402, or the multiplexers 404, is in a direction generally perpendicular to the alignment of modulators 206, laser 202, etc., which are said to be arranged in columns. Note that the multiplexers 402, 404 multiplex modulated optical signals associated with different combinations of lanes than the multiplexers 208, 210 in the layouts 200, 300 of FIGS. 2 and 3. For example, wherein the first pair 214 of multiplexers 208, 210 in layout 200 receives its input from the first lanes of the sets associated with $\lambda_0$, $\lambda_1$, $\lambda_2$, and $\lambda_3$, the first (leftmost) multiplexers 402, 404 in the two rows constituting the first multiplexing stage in layout 400 combine the first lane associated with $\lambda_0$ with the last lane associated with $\lambda_1$, and the first lane associated with $\lambda_2$ with the fourth (last) lane associated with $\lambda_3$, respectively. Similarly, the second multiplexers 402, 404 in the two rows combine the second lane associated with $\lambda_0$ with the third lane associated with $\lambda_1$, and the second lane associated with $\lambda_2$ with the last lane associated with $\lambda_3$, and so on. This configuration allows the waveguides 406 that couple the multiplexers 402 or 404 along each row to the optical modulators 206 to be nested, forming nested sets of waveguides about the respective rows (e.g., with the waveguides providing the inputs to the leftmost multiplexers 402, 404 being the outermost waveguides in the respective sets), avoiding any waveguide crossings between them. (Waveguide crossings do, however, exist between the waveguides 406 coupling the multiplexers 402, 404 to the modulators 206 and the waveguides 408 coupling the multiplexers 402, 404 to the output couplers 212.)

Note further that the two left-most multiplexers 402, 404 do not form a pair of multiplexers whose outputs are combined at the second multiplexing stage, implemented by the output couplers 212. Rather, the left-most multiplexer 402 in one row and the right-most multiplexer 404 of the other row form the first pair, connected to the first (top-most) output coupler 212; the second multiplexer 402 in the first row and the third multiplexer 404 in the second row (both from the left) form the second pair, connected to the second output coupler 212 (from the top); the third multiplexer 402 in the first row and the second multiplexer 404 in the second row form the third pair, connected to the third output coupler 212; and the fourth (and last) multiplexer 402 in the first row and the first multiplexer 404 in the second row form the fourth (and last) pair, connected to the last output coupler 212. With pairs of multiplexers 402, 404 numbered in the order of their associated output couplers 212, the order of the multiplexers 402 along the first row is in a direction opposite to the order of the multiplexers 404 along the second row. The waveguides 408 coupling the multiplexers 402, 404 to the output couplers 212 are configured symmetrically about a horizontal axis between the first and second rows. The maximum number of waveguide crossings for an individual lane in this layout 400 is the same as for layout 300 of FIG. 3:

$$X_{max} = 2\left(\frac{M}{N_\lambda} - 1\right),$$

which, for $N_\lambda=4$ and $M=16$, amounts to six.

Figure 5:
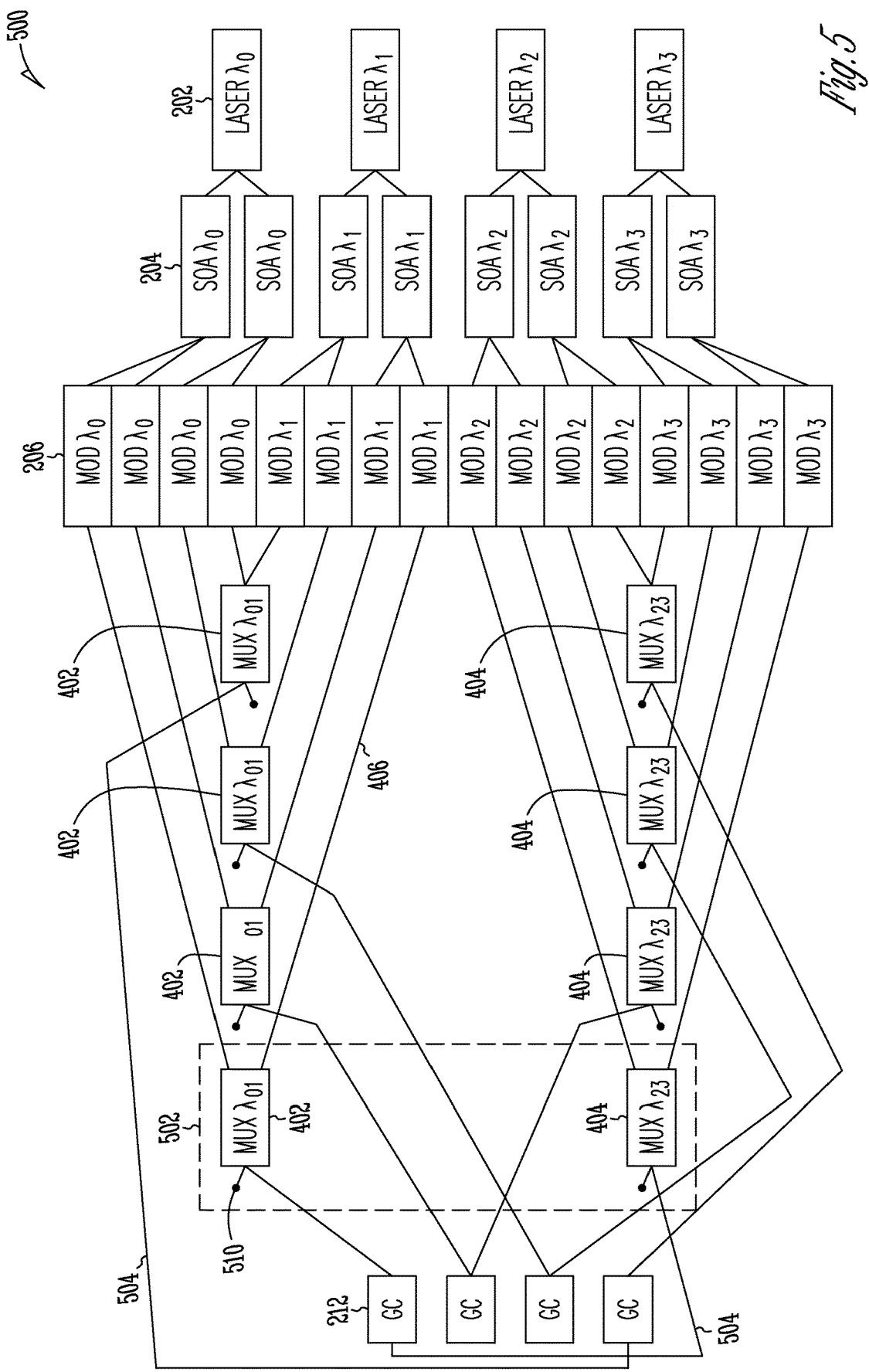
FIG. 5 is a schematic example transmitter circuitry layout in which multiplexers for different pairs of wavelengths are arranged in two respective rows, with asymmetric waveguide distribution after the multiplexers, in accordance with one embodiment.

FIG. 5 is a schematic transmitter circuitry layout 500 in which multiplexers 402, 404 for different pairs of wavelengths are arranged in two respective rows, with asymmetric waveguide distribution after the multiplexers 402, 404, in accordance with one embodiment. This layout 500 differs from the preceding layout 400 depicted in FIG. 4 in that a multiplexer 402 combining $\lambda_0$ and $\lambda_1$ and a multiplexer 404 combining $\lambda_2$ and $\lambda_3$ that form a pair of multiplexers 402, 404 connected to the same output coupler 212 are horizontally aligned. For example, the left-most multiplexers 402, 404 form a first pair 502 whose outputs are multiplexed by the first output coupler 212 into the respective transmitter output signal. This waveguide redistribution following the first multiplexing stage is achieved with an asymmetric configuration of the waveguides 504 coupling the multiplexers 402, 404 to the output couplers 212, as shown. The maximum number of waveguide crossings for an individual lane in this layout 500 is:

$$X_{max} = \frac{M}{N_\lambda},$$

which, for $N_\lambda=4$ and $M=16$, equals four, the lowest number among all four layouts 200, 300, 400, 500.

In various embodiments, optical transceiver PICs are provided with self-test functionality, implemented via loopback circuitry that can selectively route the modulated optical signals to the receivers rather than the output ports of the transmitter. In circuit architectures with a multiplexing stage preceding the output couplers 212, the multiplexers (e.g., 208, 210, 402, 404) can double as switches for this purpose. For instance, as shown in each of the transmitter circuitry layouts 200, 300, 400, 500, the multiplexers 208, 210, 402, 404 each have two output ports, a mission-mode port for providing the multiplexed optical signal to one of the output couplers 212, and a self-test port providing the signals to a coupler 510 (labeled in FIG. 5) that couples the multiplexed signal into the loopback circuitry. Phase shifters in the interferometer arms of the MZIs or AWGs implementing the multiplexers 208, 210, 402, 404 can be used to switch the multiplexed signals between the two ports.

Implementing the loopback circuitry in the same silicon waveguide layer as is used for the transmitter circuitry would add undesirable waveguide crossings. While, in layouts 200, 300, 400, the maximum number of crossings for a single lane would remain the same (and the additional waveguide crossings would be along lanes that have fewer waveguide crossings resulting from waveguide redistribution), layout 500 would suffer an increase of four added waveguide crossings per lane (i.e., $M/N_\lambda$), doubling the number of crossings for the four-wavelength, sixteen-channel case. By implementing the loopback functionality in a separate waveguide layer, in accordance herewith, such added waveguide crossings can be avoided, rendering the layout 500 generally preferable with regard to crossing-induced optical losses. (Note that the alternative layouts 200, 300, 400 may provide other advantages.)

Figure 6:
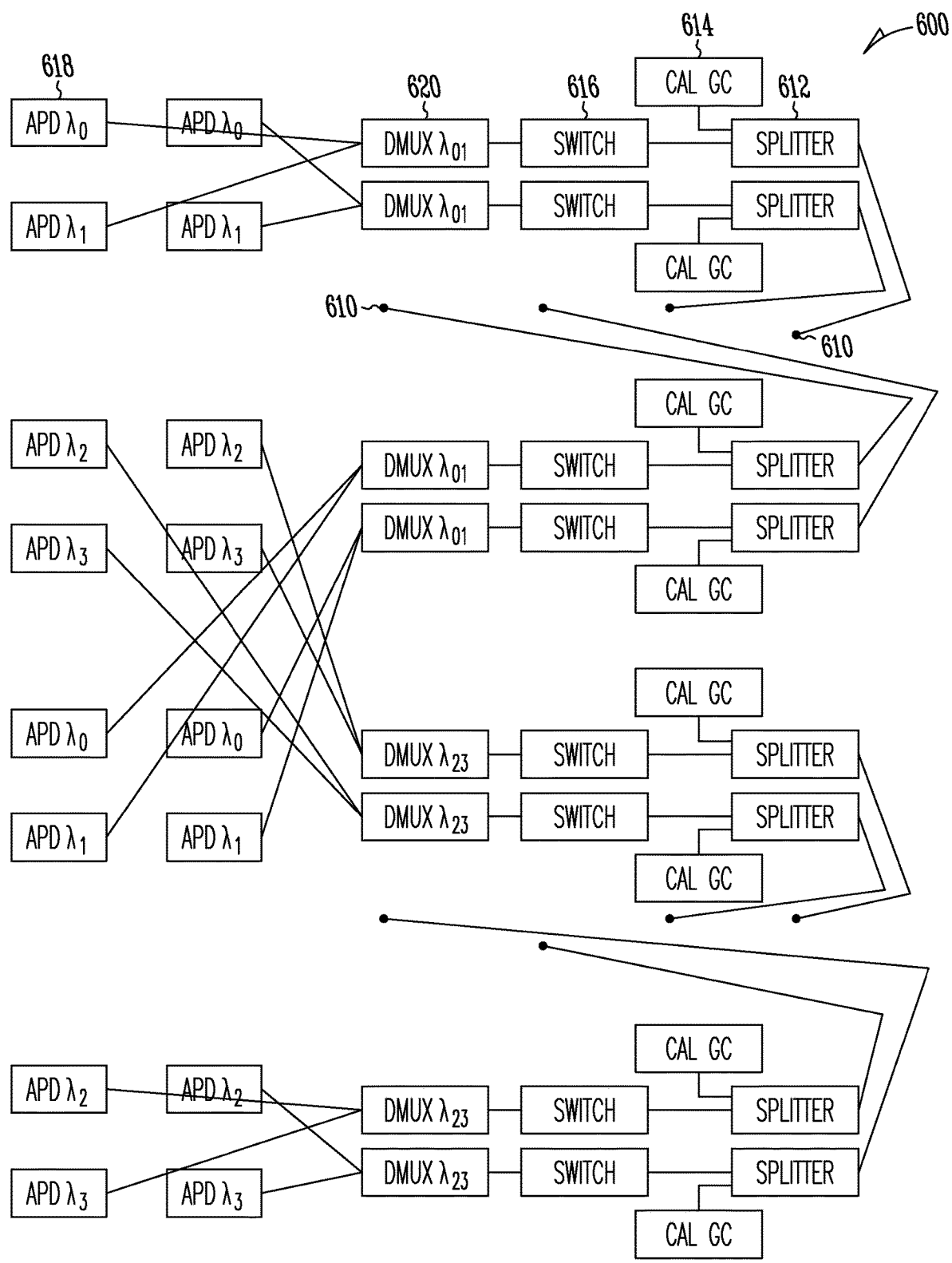
FIG. 6 is a schematic example loopback circuitry layout in accordance with one embodiment.

FIG. 6 is a schematic example loopback circuitry layout 600 in accordance with one embodiment. The depicted loopback circuitry is configured for use with the transmitter circuitry layout 500 of FIG. 5, and therefore includes optical couplers 610 at positions matching those of the optical couplers 510 at the self-test output ports of the multiplexers in the transmitter circuitry. In other words, the optical couplers 610 are located in the bottom silicon waveguide layer 116 directly underneath the optical couplers 510 of the top silicon waveguide layer 120. A pair of couplers 510, 610 may be formed, e.g., by two grating couplers, one redirecting in-plane light in the top layer 120 straight down towards the bottom layer 116, and the other receiving the out-of-plane light and redirecting it into the plane of the waveguide layers 116. Alternatively, two evanescently coupled waveguide sections in the top and bottom waveguide layers 120, 116 may together provide the functionality of the couplers 510, 610.

The loopback circuitry may include optical splitters 612, one for each of the partially multiplexed optical signals received from the transceiver circuitry, that split off a portion of each signal and provide it to a grating coupler 614 that couples the light out of the PIC and into calibration equipment, such as, e.g., a spectrum analyzer that may be used for calibrating the respective laser 102 from which the optical signal originates. The other output of each splitter 612 is connected to an optical switch 616 (or cascade of switches), e.g., implemented with an MZI, that is turned on in self-test mode, but turned off during mission mode to prevent light generated in the transmitter from reaching, and interfering with, the operation of the receiver photodiodes 618. In self-test mode, the optical signals are passed to demultiplexers 620 that separate the two wavelength components of the partially multiplexed optical signals. The resulting sixteen demultiplexed optical signals are coupled into the photodiodes 618 formed usually in the III-V layer above the top silicon waveguide layer, e.g., via grating couplers, or by coupling back to the top silicon layer first, and then coupling the top silicon waveguide into the photodiodes 618. The photodiodes 618 may be, e.g., avalanche photodiodes (APDs), which operate at a higher electrical bias, e.g., 2-10× higher than a typical non-avalanche photodiode, and provide electrical gain as generated electron and hole pairs are accelerated by the higher electrical bias and impact the crystal lattice, generating additional electron and hole carriers, which amplifies the received electrical signal. The APDs are used to compensate for low amplitude in the measured optical signals, and can replace much larger and higher-power-consumption SOAs in the optical receiver or high-gain stages in the transimpedance amplifier after the photodetector 618.

The foregoing description provides a method for making two-layer optical transceiver PICs that separate transmitter and loopback circuitry between two silicon waveguide layers, along with example layouts for both waveguide layers. The disclosed two-layer configuration, in conjunction with waveguide redistribution in the transmitter circuitry designed for low numbers of waveguide crossing, facilitates sharing lasers between multiple lanes, which entails cost, power, and size benefits. As will be readily appreciated by those of ordinary skill in the art, the specific proposed layouts are examples only, and may be amenable to modifications and deviations from the concrete arrangement of devices and waveguides that still conform to the underlying design principles and characteristics (such as, e.g., symmetric vs. asymmetric waveguide distribution in FIGS. 4 and 5).

The following numbered examples are illustrative embodiments:

1. A photonic integrated circuit (PIC) comprising: a device layer comprising a first silicon waveguide layer; a second silicon waveguide layer separated from the first silicon waveguide layer by a dielectric layer; formed in the device layer, optical transmitter circuitry comprising multiple lasers configured to emit light at multiple respective wavelengths, the optical transmitter circuitry configured to split light from each of the lasers between multiple lanes associated with the respective wavelength, optically modulate the light in each of the lanes to generate a modulated optical signal associated with the respective lane, and multiplex the modulated optical signals across the multiple wavelengths to generate multiple optical transmitter output signals; and, formed in the second silicon waveguide layer, optical loopback circuitry optically coupled to the optical transmitter circuitry and configured to selectively couple the modulated optical signal associated with each lane to a photodiode associated with the lane.

2. The PIC of example 1, wherein the multiple wavelengths comprise at least four wavelengths, and wherein the modulated optical signals are multiplexed in first and second multiplexing stages, the first multiplexing stage comprising first multiplexers configured to multiplex the modulated optical signals across a first subset of the multiple wavelengths into first multiplexed optical signals and second multiplexers configured to multiplex the modulated optical signals across a second subset of the multiple wavelengths into second multiplexed optical signals, and the second multiplexing stage configured to multiplex the first multiplexed signals and the second multiplexed signals into the optical transmitter output signals.

3. The PIC of example 2, wherein the second multiplexing stage is implemented by optical output couplers.

4. The PIC of example 2 or example 3, wherein the light in each lane is modulated by an optical modulator associated with the lane, the optical modulators being arranged along a first column, grouped by wavelength, the optical transmitter circuitry further comprising waveguides coupling the first and second multiplexers of the first multiplexing stage to the optical modulators and waveguides coupling the first and second multiplexers of the first multiplexing stage to the second multiplexing stage.

5. The PIC of example 4, wherein the first and second optical multiplexers are arranged in a second column, and wherein the waveguides cross only between the first and second columns.

6. The PIC of example 5, wherein the first and second optical multiplexers alternate along the second column.

7. The PIC of example 5 or example 6, wherein the multiple wavelengths consist of $N_\lambda$ wavelengths and the lanes consist of M lanes, and wherein, for each of the lanes, a number of waveguide crossings associated with the lane does not exceed $$M - \frac{M}{N_\lambda} - (N_\lambda - 1).$$

8. The PIC of example 4, wherein the first and second optical multiplexers are arranged in a second column, each grouped together along the second column.

9. The PIC of claim 8, wherein the multiple wavelengths consist of $N_\lambda$ wavelengths and the lanes consist of M lanes, and wherein, for each of the lanes, a number of waveguide crossings associated with the lane does not exceed $$2\left(\frac{M}{N_\lambda} - 1\right).$$

10. The PIC of example 4, wherein the first multiplexers are arranged in a first row and the second multiplexers are arranged in a second row.

11. The PIC of example 10, wherein the waveguides coupling the first and second multiplexers of the first multiplexing stage to the optical modulators form nested sets of waveguides about the first and second rows, respectively.

12. The PIC of example 11, wherein the waveguides coupling the first and second multiplexers of the first multiplexing stage to the second multiplexing stage are configured symmetrically about an axis between the rows and parallel to the rows.

13. The PIC of example 12, wherein the multiple wavelengths consist of $N_\lambda$ wavelengths and the lanes consist of M lanes, and wherein, for each of the lanes, a number of waveguide crossings associated with the lane does not exceed $$2\left(\frac{M}{N_\lambda} - 1\right).$$

14. The PIC of example 11, wherein the waveguides coupling the first and second multiplexers of the first multiplexing stage to the second multiplexing stage are configured asymmetrically about an axis between the rows and parallel to the rows.

15. The PIC of example 14, wherein the multiple wavelengths consist of $N_\lambda$ wavelengths and the lanes consist of M lanes, and wherein, for each of the lanes, a number of waveguide crossings associated with the lane does not exceed $$\frac{M}{N_\lambda}.$$

16. The PIC of any of examples 1-15, wherein the device layer comprises III-V semiconductor structures formed on the first silicon waveguide layer.

17. A method for manufacturing an optical transceiver comprising transmitter circuitry and loopback circuitry, the method comprising: patterning a silicon layer of a silicon-on-insulator substrate to form the loopback circuitry therein; bonding a silicon substrate coated with a dielectric layer with the dielectric layer down onto the patterned silicon layer; breaking the silicon substrate along a layer of implanted defects to create a second silicon layer on top of the dielectric layer; patterning the second silicon layer to form passive device structures of the transmitter circuitry; and bonding one or more III-V die to the patterned second silicon layer and patterning the bonded III-V to form active device structures of the transmitter circuitry.

18. A photonic integrated circuit (PIC) comprising: a device layer comprising a first silicon waveguide layer; a second silicon waveguide layer separated from the first silicon waveguide layer by a dielectric layer; formed in the device layer, optical transmitter circuitry comprising four lasers configured to emit light at four respective wavelengths, the optical transmitter circuitry configured to split light from each of the lasers between four lanes to create sixteen lanes, optically modulate the light in each of the sixteen lanes to generate a modulated optical signal associated with the respective lane, and multiplex the modulated optical signals across the four wavelengths to generate four optical transmitter output signals; and, formed in the second silicon waveguide layer, optical loopback circuitry optically coupled to the optical transmitter circuitry and configured to selectively couple the modulated optical signal associated with each lane to a photodiode associated with the lane.

19. The PIC of example 18, wherein the transmitter circuitry further comprises: optical modulators, arranged along a column, to generate the modulated optical signals, a first multiplexing stage comprising four first multiplexers arranged along a first row and configured to multiplex the modulated optical signals associated with two of the four wavelengths into first multiplexed optical signals and four second multiplexers arranged along a second row and configured to multiplex the modulated optical signals associated with the other two of the four wavelengths into second multiplexed optical signals, a second multiplexing stage configured to multiplex the first multiplexed optical signals and the second multiplexed optical signals into the optical transmitter output signals, first waveguides coupling the first and second multiplexers to the optical modulators, the first waveguides forming nested sets of waveguides about the first and second rows, and second waveguides coupling the first and second multiplexers to the second multiplexing stage, the second waveguides configured asymmetrically about an axis between the rows and parallel to the rows.

20. The PIC of example 19, wherein, for each of the lanes, a number of waveguide crossings associated with the lane does not exceed four.

Although the inventive subject matter has been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

What is claimed is:

1. A photonic integrated circuit (PIC) comprising:
   a device layer comprising a first silicon waveguide layer;
   a second silicon waveguide layer separated from the first silicon waveguide layer by a dielectric layer;
   formed in the device layer, optical transmitter circuitry comprising multiple lasers configured to emit light at multiple respective wavelengths, the optical transmitter circuitry configured to split light from each of the multiple lasers between multiple lanes associated with the respective wavelength, optically modulate the light in each of the multiple lanes to generate a modulated optical signal associated with the respective lane, and multiplex the modulated optical signals across the multiple wavelengths to generate multiple optical transmitter output signals; and,
   formed in the second silicon waveguide layer, optical loopback circuitry optically coupled to the optical transmitter circuitry and configured to selectively couple the modulated optical signal associated with each lane to a photodiode associated with the lane.

2. The PIC of claim 1, wherein the multiple wavelengths comprise at least four wavelengths, and wherein the modulated optical signals are multiplexed in first and second multiplexing stages, the first multiplexing stage comprising first multiplexers configured to multiplex the modulated optical signals across a first subset of the multiple wavelengths into first multiplexed optical signals and second multiplexers configured to multiplex the modulated optical signals across a second subset of the multiple wavelengths into second multiplexed optical signals, and the second multiplexing stage configured to multiplex the first multiplexed signals and the second multiplexed signals into the optical transmitter output signals.

3. The PIC of claim 2, wherein the second multiplexing stage is implemented by optical output couplers.

4. The PIC of claim 2, wherein the light in each lane is modulated by an optical modulator associated with the lane, the optical modulators being arranged along a first column, grouped by wavelength, the optical transmitter circuitry further comprising waveguides coupling the first and second multiplexers of the first multiplexing stage to the optical modulators and waveguides coupling the first and second multiplexers of the first multiplexing stage to the second multiplexing stage.

5. The PIC of claim 4, wherein the first and second optical multiplexers are arranged in a second column, and wherein the waveguides cross only between the first and second columns.

6. The PIC of claim 5, wherein the first and second optical multiplexers alternate along the second column.

7. The PIC of claim 5, wherein the multiple wavelengths consist of $N_\lambda$ wavelengths and the multiple lanes consist of M lanes, and wherein, for each of the multiple lanes, a number of waveguide crossings associated with the lane does not exceed $$M - \frac{M}{N_\lambda} - (N_\lambda - 1).$$

8. The PIC of claim 4, wherein the first and second optical multiplexers are arranged in a second column, each grouped together along the second column.

9. The PIC of claim 8, wherein the multiple wavelengths consist of $N_\lambda$ wavelengths and the multiple lanes consist of M lanes, and wherein, for each of the multiple lanes, a number of waveguide crossings associated with the lane does not exceed $$2\left(\frac{M}{N_\lambda} - 1\right).$$

10. The PIC of claim 4, wherein the first multiplexers are arranged in a first row and the second multiplexers are arranged in a second row.

11. The PIC of claim 10, wherein the waveguides coupling the first and second multiplexers of the first multiplexing stage to the optical modulators form nested sets of waveguides about the first and second rows, respectively.

12. The PIC of claim 11, wherein the waveguides coupling the first and second multiplexers of the first multiplexing stage to the second multiplexing stage are configured symmetrically about an axis between the first and second rows and parallel to the first and second rows.

13. The PIC of claim 12, wherein the multiple wavelengths consist of $N_\lambda$ wavelengths and the multiple lanes consist of M lanes, and wherein, for each of the multiple lanes, a number of waveguide crossings associated with the lane does not exceed $$2\left(\frac{M}{N_\lambda} - 1\right).$$

14. The PIC of claim 11, wherein the waveguides coupling the first and second multiplexers of the first multiplexing stage to the second multiplexing stage are configured asymmetrically about an axis between the first and second rows and parallel to the first and second rows.

15. The PIC of claim 14, wherein the multiple wavelengths consist of $N_\lambda$ wavelengths and the multiple lanes consist of M lanes, and wherein, for each of the multiple lanes, a number of waveguide crossings associated with the lane does not exceed $$\frac{M}{N_\lambda}.$$

16. The PIC of claim 1, wherein the device layer comprises III-V semiconductor structures formed on the first silicon waveguide layer.

17. A method for manufacturing an optical transceiver comprising transmitter circuitry and loopback circuitry, the method comprising:
  patterning a silicon layer of a silicon-on-insulator substrate to form the loopback circuitry therein;
  bonding a silicon substrate coated with a dielectric layer with the dielectric layer down onto the patterned silicon layer;
  breaking the silicon substrate along a layer of implanted defects to create a second silicon layer on top of the dielectric layer;
  patterning the second silicon layer to form passive device structures of the transmitter circuitry; and
  bonding one or more III-V die to the patterned second silicon layer and patterning the bonded III-V to form active device structures of the transmitter circuitry.

18. A photonic integrated circuit (PIC) comprising:
  a device layer comprising a first silicon waveguide layer;
  a second silicon waveguide layer separated from the first silicon waveguide layer by a dielectric layer;
  formed in the device layer, optical transmitter circuitry comprising four lasers configured to emit light at four respective wavelengths, the optical transmitter circuitry configured to split light from each of the four lasers between four lanes to create sixteen lanes, optically modulate the light in each of the sixteen lanes to generate a modulated optical signal associated with the respective lane, and multiplex the modulated optical signals across the four wavelengths to generate four optical transmitter output signals; and,
  formed in the second silicon waveguide layer, optical loopback circuitry optically coupled to the optical transmitter circuitry and configured to selectively couple the modulated optical signal associated with each lane to a photodiode associated with the lane.

19. The PIC of claim 18, wherein the transmitter circuitry further comprises:
- optical modulators, arranged along a column, to generate the modulated optical signals,
- a first multiplexing stage comprising four first multiplexers arranged along a first row and configured to multiplex the modulated optical signals associated with two of the four wavelengths into first multiplexed optical signals and second multiplexers arranged along a second row and configured to multiplex the modulated optical signals associated with the other two of the four wavelengths into second multiplexed optical signals,
- a second multiplexing stage configured to multiplex the first multiplexed optical signals and the second multiplexed optical signals into the optical transmitter output signals,
- first waveguides coupling the first and second multiplexers to the optical modulators, the first waveguides forming nested sets of waveguides about the first and second rows, and
- second waveguides coupling the first and second multiplexers to the second multiplexing stage, the second waveguides configured asymmetrically about an axis between the rows and parallel to the rows.

20. The PIC of claim 19, wherein, for each of the lanes, a number of waveguide crossings associated with the lane does not exceed four.

\* \* \* \* \*